United States Patent [19]

Shah

[11] 4,271,287

[45] Jun. 2, 1981

[54] PROCESS FOR THE CONTINUOUS POLYMERIZATION OF POLYETHYLENE TEREPHTHALATE IN THE SOLID PHASE

[75] Inventor: Nipun M. Shah, Fayetteville, N.C.

[73] Assignee: Rohm and Haas Company, Philadelphia, Pa.

[21] Appl. No.: 173,205

[22] Filed: Jul. 28, 1980

Related U.S. Application Data

[63] Continuation-in-part of Ser. No. 79,669, Sep. 28, 1979.

[51] Int. Cl.³ ............................................. C08G 63/26
[52] U.S. Cl. .................................. 528/272; 528/309; 528/480
[58] Field of Search ..................... 528/272, 309, 480

[56] References Cited

U.S. PATENT DOCUMENTS 4,064,112  12/1977  Roth et al. ........................... 528/272
4,161,578  7/1979   Herron ................................. 528/272

*Primary Examiner*—Lucille M. Phynes
*Attorney, Agent, or Firm*—Jordan J. Driks

[57] ABSTRACT

Amorphous polyethylene terephthalate can be polycondensed in the solid phase to a higher molecular weight product by a continuous process involving preheating the polymer under forced motion, at least partially crystallizing the preheated polymer in a fixed bed, and polycondensing the polymer in a forced motion reactor at temperatures in the range of 220° to 245° C.

4 Claims, 1 Drawing Figure

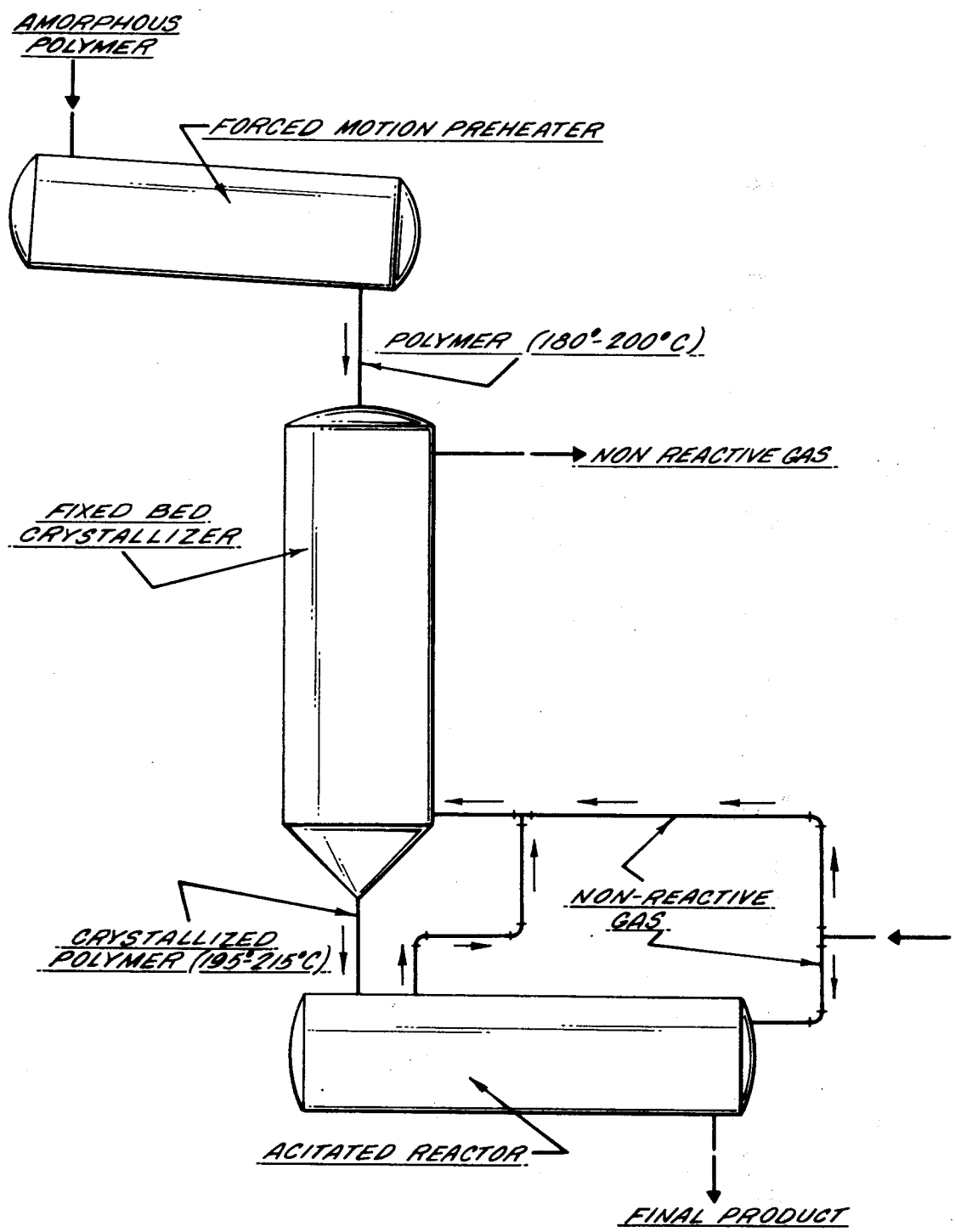

PROCESS FOR THE CONTINUOUS POLYMERIZATION OF POLYETHYLENE TEREPHTHALATE IN THE SOLID PHASE

BACKGROUND OF THE INVENTION AND PRIOR ART

This application is a continuation-in-part of copending application Ser. No. 79,669 filed Sept. 28, 1979.

Polyethylene terephthalate (PET) is commonly produced by melt polymerization to produce an essentially amorphous polymer having a softening temperature in the range of about 100° to 150° C. and an intrinsic viscosity in the range of about 0.50 to 0.65. While such polymeric products are suitable for direct spinning to fiber, higher molecular weight polymer, i.e., polymer with a higher intrinsic viscosity of the order of 0.7 to substantially in excess of 1, is required for the production of products such as bottles. While the molecular weight of such polymers may be increased by polycondensation in the molten state, e.g., in autoclaves, thermal degradation usually accompanies such polycondensation with a deterioration of polymer color and an increase in impurity levels.

Roth et al. U.S. Pat. No. 4,064,112 and Herron U.S. Pat. No. 4,161,578 detail earlier attempts to conduct polycondensation at temperatures below the melting point of the condensate. The tendency of the low melting amorphous polymer to soften and agglomerate in the reaction vessel burden these prior art solid phase processes with difficulties in product removal and/or with requirements for large amounts of mechanical energy to overcome or avoid agglomeration.

Both Roth et al. and Herron propose somewhat similar solutions to the problems encountered in these prior art attempts at solid phase polycondensation of polyethylene terephthalate. Typically, a polyethylene terephthalate chip which is at least 50% crystalline does not become tacky until a temperature of about 245° C. as compared to the 100° to 150° C. softening range characteristic of the amorphous polymer. Both Roth et al. and Herron utilize a two stage process in which amorphous polymer is first partially crystallized under forced motion or agitation and then is polycondensed in a fixed bed reactor, thereby reducing the sticking problems.

The Roth et al. process requires a relatively high crystallization temperature in the range of about 220° C. to 260° C. and further requires that the crystallization temperature be equal to or greater than the temperature employed for polycondensation. Preferably both temperature of crystallization and temperature of polycondensation are in the range of 230° C. to 245° C. subject to the above-mentioned limitation that the crystallization temperature show at least equal the polycondensation temperature. Unfortunately, this process merely transfers a substantial part of the agglomeration problem out of the reactor into the crystallizer. The amorphous material fed to the crystallizer is easily softened at the higher temperatures encountered in the crystallizer and quickly becomes tacky. The agitator blades or other "forced motion" means soon become coated with the sticky polymer; frequent shut-downs for cleaning are required. Further, the tacky mass and coated blades require substantial expenditure of energy in order to stay operational between cleanings. Since the crystallization reaction is exothermic, this release of energy once the mass reaches crystallization temperature further compounds the problem of avoiding localized overheating with its concomittant softening and agglomeration of particles in the crystallizer.

The Herron process utilizes lower temperatures and requires that the crystallization temperature be lower than the polycondensation temperature. Typically, crystallization is conducted in the range of about 180° to 220° C. and polycondensation is conducted in the range of about 200° to 230° C. Thus, Herron seeks to avoid the problems encountered by Roth et al. by utilizing a significantly lower temperature in the crystallizer; this, however, requires Herron to sacrifice reaction time through the use of substantially lower temperatures in the polycondensation stage. Since polycondensation is a time-temperature dependent function, Herron must accept a lower degree of polycondensation or a higher residence time with its higher cost of operation and energy.

SUMMARY OF THE INVENTION

It has now been found that amorphous polyethylene terephthalate can be crystallized and subjected to polycondensation without sacrificing either throughput or product quality to produce a higher molecular weight polymer having a final intrinsic viscosity as high as 1.40. While bearing certain superficial similarities to the Roth et al. and Herron process in that polymer is crystallized prior to polycondensation, the process of this invention differs markedly. For example, in the present invention, the significant crystallization is conducted in a fixed bed and the significant polycondensation reaction is conducted in a highly agitated reactor. Thus, unlike Roth et al., it is possible to use a moderate crystallization temperature and take advantage of the heat of crystallization to maintain the temperature in the fixed bed crystallizer. Unlike Herron, it is possible to conduct the polycondensation reaction at relatively high temperatures in the most efficient, highly agitated manner. While by this process the crystallization process may take somewhat longer than encountered in the prior art, the greatly reduced time required for the polycondensation reaction through the use of high temperatures and agitation more than compensates.

THE DRAWING

The single FIGURE is a schematic diagram illustrating the preferred embodiment of the invention. As shown the system comprises the combination of a forced motion heat transfer unit, a fixed bed type crystallizer and an agitated reactor.

DETAILED DESCRIPTION OF THE INVENTION

With reference to the drawing, it is seen that the invention comprises the combination of fixed bed crystallization with agitated reactor polycondensation at relatively high temperatures. Amorphous polymer, i.e., polymer with less than about 40% crystallinity, usually less than about 25% crystallinity, is rapidly preheated with substantial agitation to a temperature in the range of about 180° C. to about 215° C. While a moderate amount of crystallization may be expected during this preheat stage, i.e., crystallization may go as high as 40%, the residence time is too short for there to be substantial change in the intrinsic viscosity of the product. Accordingly, the feed product to the fixed bed crystallizer from the preheater can be characterized as being at a temperature in the range of about 180° C. to 215° C. having an intrinsic viscosity in the range of about 0.40 to 0.70 and having a crystallinity in the range of less than about 40%.

In the fixed bed crystallizer a non-reactive gas, i.e., an inert gas or a gas such as nitrogen is passed in countercurrent direction through the bed of gradually descending polymer. The rate of flow and temperature of the gas is correlated with the polymer temperature, the polymer rate of descent in the fixed bed and the evolved heat of crystallization to maintain the temperature throughout most of the fixed bed crystallizer in the temperature range of 180° to 215° C. In general, a temperature gradient of about 15° can be expected from one end of the fixed bed to the other with the temperature increasing as the product descends through the crystallizer. Following these procedures and with residence times of the order of 2 to 24 hours and generally in the range of about 5 to 18 hours the crystallinity of the product can be increased to at least 40% and generally to a value in the range of about 50 to 60%. With these residence times and temperatures, some increase in the intrinsic viscosity indicating polycondensation can be expected but the increase should not generally exceed 20% of the initial value and will generally be on the order of 10 to 15%.

With a large portion of the polymeric product of the crystallizer having been crystallized in a uniform manner without significant bridging or agglomeration of the particles, the product is now in condition to function as a suitable feed to the reactor. A uniform softening temperature of 250° C. or higher can be expected for the polymer particles, the product can be passed into the agitated reactor at temperatures up to 245° C. with little likelihood of agglomeration or coating of the agitator. The use of agitation further reduces the likelihood of localized overheating and provides that uniformity of reaction which is desirable to produce a polycondensed product of uniform intrinsic viscosity and molecular weight. While it is possible to operate the reactor at relatively slow rates with residence times as high as 24 hours, the high temperatures employed with the highly crystallized product permit polycondensation reaction times of less than about 6 hours to produce a final product having an intrinsic viscosity well above 0.70 and, as noted, even as high as 1.40. As is generally known in the art, the maximum polycondensation will occur with the highest reaction temperature and the longest residence time. As is also well known to the art, various combinations of residence time and temperature can be selected to give equivalent polycondensation reactions depending on the particular needs for balancing the rate of production in the overall system.

EXAMPLES

In the examples which follow, and throughout the disclosure and claims, intrinsic viscosity is determined at 30° C. by dissolving 0.5 grams of polymer in 100 ml. of a 60:40 mixture of phenol and tetrachloroethane. The polyethylene terephthalate for the examples is of fiber-spinning quality in granule measuring 4 mm×4 mm×2 mm. The particular granular size is not, however, critical to the practice of the invention other than as known in the art for operation of a fixed-bed system. The term "fixed bed" is used to distinguish the system from fluidized beds; it is not intended to encompass static beds or other batch operations in which the bed particles are essentially motionless.

In these examples the preheater is any suitable agitated heat transfer unit which can raise the temperature of the amorphous polymer to the specified level without substantial polycondensation and with only a limited amount of crystallization. The high agitation, high heat transfer apparatus disclosed in U.S. Pat. No. 3,425,135 to Langsetmo et al. is quite effective for this purpose. For these examples, the polymer has a residence time of about 10 minutes in said preheater. Table I summarizes and exemplifies the operation of this stage of the process of the present invention.

TABLE I

| | Operation of Preheater | | | | |
|---|---|---|---|---|---|
| | Amorphous PET, Fed as Chip | | Preheater Product For Feed to Crystallizer | | |
| Example No. | Intrinsic Viscosity | Crystallinity % | Intrinsic Viscosity | Crystallinity % | Temp. °C. |
| 1 | 0.58 | 14 | 0.58 | 36 | 190 |
| 2 | 0.58 | 14 | 0.58 | 35 | 180 |
| 3 | 0.58 | 14 | 0.58 | 36.1 | 190 |
| 4 | 0.62 | 14 | 0.62 | 36 | 200 |
| Operative Ranges | at least 0.40 | up to 25% | less than 0.70 | less than 40% | 180 to 200 |

The fixed bed crystallizer utilized for the purposes of the present invention is essentially the same in structure and design as that employed by Roth et al. and Herron as a fixed bed reactor. The crystallizer is sized to meet the requirements of residence time, throughput and temperature increase; for proper operation of the fixed bed, the bed diameter-to-height ratio should be in the range of 1:4 to 1:8. In a preferred practice preheated polymer is fed to the top of the crystallizer bed and crystallized product is removed from the bottom. A non-reactive gas, in this case nitrogen, is introduced into the bottom of the bed and passes upward therethrough with subfluidizing velocity. Preferably the non-reactive gas has been preheated in the agitated reactor and is then cycled into the crystallizer without chilling the polymer bed. Once crystallization, equilibrium is established, the considerable heat of crystallization is carried by the non-reactive gas upward through the crystallizer to heat incoming and descending polymer thereby substantially increasing the energy efficiency of the operation through utilization of this evolved heat.

As might be expected with the temperature and residence times encountered in the crystallizer, some polycondensation will occur and an increase in intrinsic viscosity of the order of about 0.1 will usually be encountered. While it is practical to operate the fixed bed crystallizer in a manner to raise the percentage crystallinity to only about 40% the most satisfactory operation is encountered in the overall process if crystallinity is increased to above 50%. No major advantage is obtained; however, in crystallizing beyond about 60% since the softening temperature of product of 60% crystallinity is more than adequate to ensure that there will be essentially no agglomeration in the highly agitated, high temperature reactor of the present invention.

Operation of the fixed bed crystallizer for Examples 1 through 4 is illustrated in Table II.

TABLE II

Operation of Fixed-Bed Crystallizer

| Ex. No. | Fixed Bed Temperature, °C. at: Top | Fixed Bed Temperature, °C. at: Middle | Fixed Bed Temperature, °C. at: Bottom | Polymer Residence Time, hr. | Crystallizer Product For Feed to Agitated Reactor Intrinsic Viscosity | Crystallizer Product For Feed to Agitated Reactor Crystallinity % | Crystallizer Product For Feed to Agitated Reactor Temp., °C. |
|---|---|---|---|---|---|---|---|
| 1 | 190 | 205 | 205 | 14 | 0.69 | 51 | 205 |
| 2 | 180 | 195 | 195 | 14 | 0.62 | 48 | 195 |
| 3 | 190 | 205 | 205 | 14 | 0.69 | 51 | 205 |
| 4 | 200 | 215 | 215 | 10 | 0.72 | 53 | 215 |
| Operative Ranges | 180 to 200 | 190 to 215 | 195 to 215 | 2 to 24 | Up to 0.75 | 40 to 60 | 195 to 215 |

With the polymeric product substantially crystallized and a major part of the heat of crystallization evolved, the product is now ready for polycondensation at elevated temperatures without substantial danger of agglomeration in the agitated reactor. The agitator reactor may be essentially identical with the heat transfer apparatus described in Herron U.S. Pat. No. 4,161,578 as a THERMASCREW operated according to the desired residence time and temperature of treatment. By operating the reactor at temperatures as high as 245° C. with a residence time up to 10 hours and thorough agitation during the period of reaction, it is possible to produce polycondensed product having an intrinsic viscosity as high as 1.4. In general, however, for bottle manufacture it will be sufficient to polycondense the product to an intrinsic viscosity in the range of about 0.7 to about 1.1. To maintain a high quality product it is again desirable to have a non-reactive gas passed through the agitated reactor countercurrent to the travel of product through the reactor. This non-reactive gas should be heated to the temperature of the agitated reactor; the gas exhausted from the reactor can be introduced into the crystallizer for further heating of the crystallizer bed thereby effectively conserving energy and gas throughout the process. A summary of the operation of the agitated crystallizer for Examples 1 through 4 and the characteristics of the product obtained therefrom are provided in Table III.

TABLE III

Operation of Agitated Reactor

| Example No. | Reactor Temperature, °C. | Polymer Residence Time, hr. | Product Intrinsic Viscosity |
|---|---|---|---|
| 1 | 225 | 4 | 0.77 |
| 2 | 225 | 4 | 0.70 |
| 3 | 230 | 4 | 0.81 |
| 4 | 230 | 4 | 0.85 |
| Operative Ranges | 220 to 245 | Up to 10 | Up to 1.4 |

Many modifications and variations of the present invention should be apparent and can be made without departing from the spirit or scope of the present invention. The specific embodiments are given by way of example only and the invention is limited only by the appended claims.

I claim:

1. In a process for the continuous production of high molecular weight polyethylene terephthalate by polycondensation in the solid phase from a dried granulated polyethylene terephthalate in which the granulated polyethylene terephthalate is first at least partially crystallized following which the partially crystallized material is subjected to polycondensation, the improvement which comprises:
   (A) first preheating said polymer under forced motion to a temperature in the range of about 180° C. to 200° C. without substantial increase in the intrinsic viscosity of said polymer and while maintaining the crystallinity below about 40%;
   (B) at least partially crystallizing said preheated polymer in a fixed bed crystallizer by feeding said polymer into said fixed bed at a temperature in the range of about 180° to 200° C., maintaining it in said bed for a time sufficient to raise the crystallization to a value in the range of 40 to 60% while maintaining the intrinsic viscosity of the polymer below about 0.75, and thereafter removing it from said bed at a temperature in the range of about 195° to 215° C.; and
   (C) effecting said polycondensation under forced motion in an agitated reactor by introducing the product of step (B) into said agitator reactor and raising the temperature thereof to a value in the range of about 220° to 245° for a period of time sufficient to raise the intrinsic viscosity of the polymer to a value of at least 0.70 up about 1.4, steps (B) and (C) being conducted under a non-reactive gas atmosphere.

2. A process in accordance with claim 1 in which said polymer in step (A) is amorphous polyethylene terephthalate chip characterized by less than 25% crystallinity and an intrinsic viscosity in the range of 0.40 to 0.70.

3. A process in accordance with claim 1 in which the residence time of said polymer in said crystallizer in step (B) is at least 10 hours and in which said polymer is crystallized to at least 50% crystallinity.

4. A process in accordance with claim 1 in which the polymer residence time in the agitator reactor of step (C) is about 4 hours.